United States Patent
Oberteuffer et al.

(10) Patent No.: US 6,438,523 B1
(45) Date of Patent: Aug. 20, 2002

(54) PROCESSING HANDWRITTEN AND HAND-DRAWN INPUT AND SPEECH INPUT

(76) Inventors: John A. Oberteuffer, 14 Glen Rd. S., Lexington, MA (US) 02420; John Wilbanks, 78 Porter Rd. #22, Cambridge, MA (US) 02140; Kyung-Ho Loken-Kim, 31 Robbins Rd., Lexington, MA (US) 02421; William Kania, 21 Wayside Rd., Westborough, MA (US) 01581

( * ) Notice: Subject to any disclaimer, the term of this patent is extended or adjusted under 35 U.S.C. 154(b) by 0 days.

(21) Appl. No.: 09/313,664

(22) Filed: May 18, 1999

Related U.S. Application Data
(60) Provisional application No. 60/086,346, filed on May 20, 1998.

(51) Int. Cl.⁷ .............................. G10L 21/00; G06K 9/03
(52) U.S. Cl. ...................... 704/270; 704/251; 382/186; 382/187
(58) Field of Search ................................ 704/235, 236, 704/255, 270, 260, 251; 382/187, 186, 189; 345/157

(56) References Cited

U.S. PATENT DOCUMENTS

| | | |
|---|---|---|
| 4,401,855 A | 8/1983 | Broderson et al. |
| 4,689,761 A | 8/1987 | Yurchenco |
| 4,748,674 A | 5/1988 | Freeman |
| 5,157,384 A | 10/1992 | Greanias et al. |
| 5,177,685 A | 1/1993 | Davis et al. |
| 5,208,786 A | 5/1993 | Weinstein et al. |
| 5,377,303 A | 12/1994 | Firman |
| 5,404,524 A | 4/1995 | Celi, Jr. |
| 5,459,798 A | 10/1995 | Bailey et al. |
| 5,463,696 A | 10/1995 | Beernink et al. |
| 5,502,774 A | 3/1996 | Bellegarda et al. |
| 5,528,726 A | 6/1996 | Cook |
| 5,546,538 A | 8/1996 | Cobbley et al. |
| 5,546,565 A * | 8/1996 | Suzuki ........................ 382/187 |
| 5,583,542 A | 12/1996 | Capps et al. |
| 5,583,946 A | 12/1996 | Courdol |
| 5,592,589 A | 1/1997 | Poon |
| 5,600,765 A | 2/1997 | Ando et al. |
| 5,606,702 A | 2/1997 | Diel et al. |
| 5,615,299 A | 3/1997 | Bahl et al. |
| 5,621,809 A | 4/1997 | Bellegarda et al. |
| 5,621,857 A | 4/1997 | Cole et al. |
| 5,625,749 A | 4/1997 | Goldenthal et al. |

(List continued on next page.)

FOREIGN PATENT DOCUMENTS

| | | |
|---|---|---|
| JP | 61240361 | 10/1986 |
| JP | 06006436 | 1/1994 |
| JP | 6-131108 | 5/1994 |
| JP | 06131108 | 5/1994 |
| JP | 08180022 | 7/1996 |
| JP | 10083195 | 3/1998 |

OTHER PUBLICATIONS

Luc Julia and Adam Cheyer, "A Multimodal Computer–augmented interface for Distributed Applications"; Symbiosis of Human and Artifact; Elsevier 1995, pp. 237–240.

(List continued on next page.)

*Primary Examiner*—David D. Knepper
(74) *Attorney, Agent, or Firm*—Finnegan, Henderson, Farabow, Garrett & Dunner, L.L.P.

(57) ABSTRACT

Techniques consistent with this invention process handwritten or hand-drawn input and speech input. Method steps include recognizing received handwritten or hand-drawn input, recognizing received speech input, and creating or modifying an electronic document according to the speech or handwritten or hand-drawn input. An apparatus includes structure for recognizing handwritten or hand-drawn input, structure for recognizing speech input, and structure for activating modes for processing the handwritten or hand-drawn input and the speech input responsive to commands in the handwritten or hand-drawn input and the speech input.

40 Claims, 10 Drawing Sheets

U.S. PATENT DOCUMENTS

| | | | |
|---|---|---|---|
| 5,633,954 A | | 5/1997 | Gupta et al. |
| 5,655,148 A | | 8/1997 | Richman et al. |
| 5,666,139 A | | 9/1997 | Thielens et al. |
| 5,668,573 A | | 9/1997 | Favot et al. |
| 5,687,221 A | | 11/1997 | Oheda et al. |
| 5,701,393 A | | 12/1997 | Smith et al. |
| 5,712,957 A | | 1/1998 | Waibel et al. |
| 5,781,179 A | * | 7/1998 | Nakajima et al. ............ 704/251 |
| 5,855,000 A | * | 12/1998 | Waibel et al. ............... 704/235 |

OTHER PUBLICATIONS

Minh Tue Vo and Cindy Wood; "Building an Application Framework for Speech and Pen Input Integration in Multimodal Learing Interfaces"; 1996 IEEE; pp. 3545–3548.

Luc Julia and Claudie Faure; "Pattern Recognition and Beautification for Pen Based Interface"; 1995 IEEE Comput. Soc. Press; Proceedings of the Third International Conference on Document Analysis and Recognition; vol. 1; pp. 58–63.

Sharon L. Oviatt, Philip R. Cohen, and Michelle Wang; Toward Interface Design for Human Language Technology: Modality and Structure as Determinants of Linguistic Complexity; 1994 Elsevier Science B.V.; Speech Communication 1994; pp. 283–300; vol. 15, Nos. 3–4.

Bernhard Suhm; "Empirical Evaluation of Interactive Multimodal Error Connection"; 1997 IEEE Workshop on Automatic Speech Recognition and Understanding Proceedings; pp. 583–590.

Fonix Press Release; Fonix Announces Pen/Voice™ Solution for Public Safety; http://www.fonix.com/fonixnews/pressreleases/1999/feb/press021999.htm; printed Apr. 4, 2000; pp. 1–3.

Sharon Oviatt and Erik Olsen; "Integration Themes in Multimodal Human—Computer Interaction"; 1994 International Conference on Spoken Language Processing Sep. 18–22, 1994; pp. 551–554.

Adam Cheyer and Luc Julia; "Multimodal Maps: An Agent-Based Approach"; Multimodal Human—Computer Communications; pp. 111–121; Springer; 1998.

Sharon L. Oviatt, Philip R. Cohen, and Michelle Wang; "Reducing Linguistic Variability in Speech and Handwriting through Selection of Presentation Format"; Computer Dialogue Laboratory & Artificial Intelligence Center SRI International, Menlo Park, California.

International Search Report dated Sep. 8, 1999.

Newton MessagePad Handbook; Chapter 2, Handwriting, Text, and Drawing; 1993; pp. cover, i–viii, 1–39.

Automatic Speech Recognition; ASRNews; Market, Investment and Technical News of the Emerging Automatic Speech Recognition Industry; May 1992; vol. 3 No. 5; pp. cover, 6–7.

Automatic Speech Recognition; ASRNews; Market, Investment and Technical News of the Emerging Speech Recognition Industry; Sep 1992; vol. 3 No. 9; pp. cover, 6–7.

Richard A. Bolt; "Put–That–There": Voice and Gesture at the Graphics Interface; Architecture Machine Group Massachusetts Institute of Technology, Cambridge, Massachusetts; pp. 262–270.

Hewitt D. Crane and Dimitry Rtischev; State of the Art; Pen and Voice Unite; Adding pen and voice input to today's user interfaces opens the door for more natural communication with your computer; BYTE Oct. 1993; pp. title, 99.

Alex Rudnicky; State of the Art; Pen and Voice Unite; Matching the Input Mode of the Task; BYTE Oct. 1993; pp. 100–102.

Laurence Nigay and Joëlle Coutaz; Papers; "A Generic Platform for Addressing the Multimodal Challenge"; Abstract; May 7–11 1995 Chi '95 Mosaic of Creativity; pp. 98–105.

Sharon Oviatt, Antonella De Angeli and Karen Kuhn; "Integration and Synchronization of Input Modes During Multimodal Human—Computer Interaction"; Center for Human—Computer Communication, Department of Computer Science and Engineering, Oregon Graduate Institute of Science and Technology, Portland, OR; pp. 415–422.

Edwin Bos, Carla Huls and Wim Claassen, "EDWARD: full integration of language and action in a multimodal user interface"; Int. J. Human—Computer Studies (1994) 40, 1994 Academic Press Limited; pp. 473–495.

Will Hill, David Wroblewski, Tim McCandless, and Rich Cohen; "Architectural Qualities and Principles for Multimodal and Multimedia Interfaces"; Chapter 17; pp. 311–318.

Alexander I. Rudnicky and Alexander G. Hauptmann; "Multimodal Interaction in Speech Systems"; Chapter 10, pp. 147–171.

Amir Mane, Susan Boyce, Demetrios Karis, and Nicole Yankelovich; "Designing the User Interface for Speech Recognition Applications"; A Chi 96 Workshop; SIGCHI Bulletin; vol. 28, No. 4, Oct. 1996; pp. 29–34.

Alan Wexelblat; "Gesture at the User Interface"; SIGCHI Bulletin; Apr. 1996, vol. 28, No. 2, pp. 22–26.

Randy Pausch and Rich Gossweiler; "Application–Independent Object Selection From Inaccurate Multimodal Input"; Chapter 9; pp. 139–145.

Karl–Heinz Hanne and Hans–Jörg Bullinger; "Multimodal Communication: Integrating Text and Gestures"; Chapter 8; pp. 127–138.

M.L. Bourguet, S. Mimura, S. Ikeno and M. Komura; "A Multimodal Operational System for Security Services"; Intelligent Systems laboratory SECOM Co., Ltd; Symbiosis of Human and Artifact; 1995; pp. 219–224.

Philip R. Cohen, Michael Johnston, David McGee, Sharon Oviatt, Jay Pittman, Ira Smith, Liang Chen and Josh Clow; "QuickSet: Multimodal Interaction for Simulation Set–up and Control "Abstract; Center for Human Computer Communication, Oregon Graduate Institute of Science and Technology, Portland, OR; pp. 1–6.

Alex Waible, Minh Tue Vo, Paul Duchnowski, and Stefan Manke; "Multimodal Interfaces"; Abstract; Carnegie Mellon University, Pittsburgh, PA, 1996.

I. McKay, M.A. Jack, R. Thomson; "Report Generation using Multi–modal Data Entry for Office Systems"; Abstract; IEE Colloquium (Digest) Proceedings of the 1996 IEE Colloquium on Interfaces; 1996.

Stefan Muench, Ruediger Dillmann; "Haptic Output in Multimodal User Interfaces"; Abstract; International Conference on Intelligent User Interfaces, Proceedings of the 1997 International Conference on Intelligent User Interfaces; 1997.

Jean–Francois Arcand, Christopher Ramstein; "Artificial Neural Network for the Design of an Adaptive Multimodal Interface"; Abstract; Proceedings of the International Conference on Tools with Artificial Intelligence Proceedings of the 1995 IEEE $7^{th}$ International Conference on Tools with Artificial Intelligence; 1995.

G. Faconti, M. Bordegoni, K. Kansy, P. Trahanias, T. Rist, and M. Wilson; "Formal Framework and Necessary Properties of the Fusion of Input Modes in User Interfaces"; Abstract; Interacting with Computers v 8 n 2 Jun. 1996, pp. 134–161.

Shiro Kawai, Hitoshi Aida and Tado Saito; "Designing Interface Toolkit with Dynamic Selectable Modality"; Abstract; Annual ACM Conference on Assistive Technologies, Proceedings of the 1996 $2^{nd}$ ACM Conference on assistive Technologies Apr. 11–12, 1996.

Alan Wexelblat and Marc Cavazza; "Gesture at the user Interface"; Abstract; Human Factors in Computing Systems (CHI)—Conference Proceedings Proceedings of the Conference on Human Factors in Computing Systems, May 7–11, 1995.

James Flanagan and Ivan Marsic; "Issues in Measuring the Benefits of Multimodal Interfaces"; Abstract; ICASSP, IEEE International Conference on acoustics, Speech and Signal Processing 1997.

Claudie Faure; "Pen and Voice Interface for Incremental Design of Graphic Documents"; Abstract IEE Colloquium (Digest) Computing and Control Division Colloquium on Handwriting and Pen–Based Input Mar. 11, 1994.

Y. Namba, S. Tano, and H. Kinukawa; "Semantic Analysis Using Fusionic Property of Multimodal Data"; Abstract; Transactions of the Information Processing Society of Japan, vol. 38, No. 7, pp. 1441–1453.

Shulin Yang and Kuo–Chu Chang; "Multimodal Pattern Recognition by Modular Neural Network"; Abstract; Optical Engineering, vol. 37, No. 2, pp. 650–659; Feb. 1998.

A. Burstein, A.C. Long, Jr., S. Narayanaswamy, R. Han and R.W. Brodersen; "The InfoPad User Interface"; Abstract; Digest of Papers COMPCON'95; 1995.

L. Nigay and J. Coutaz; "Design Spaces for Multimedia and Multimodal Interaction"; Abstract; Technique et Science Informatiques, vol. 15, No. 9, pp. 1195–1225; 1996.

S. Oviatt; "Multimodal Interactive Maps: Designing for Human Performance"; Abstract; Human—Computer Interaction, vol. 12, No. 1–2, pp. 93–129; 1997.

T. Wakahara, A. Suzuki, N. Nakajima, S. Miyahara and K. Odaka; "On–line Cursive Kanji Character Recognition as Stroke Correspondence Problem"; Abstract; Proceedings of the Third International Conference on Document Analysis and Recognition, p. 2, vol. xxvi +1188, 1059–64 vol. 2; 1995.

J.L. Leopold and A.L. Ambler; "Keyboardless Visual Programming Using Voice, Handwriting, and Gesture"; Abstract; Proceedings, 1997 IEEE Symposium on Visual Languages (Cat. No. 97TB100180), p. xiii+451, 28–35; 1997.

A. Malaviya, C. Leja and L. Peters; "Multi–script Handwriting Recognition with FOHDEL"; Abstract; 1996 Biennial Conference on the North American Fuzzy Information Processing Society—NAFIPS (Cat. No. 96th8171), p. 601, 147–51; 1996.

K. Kiyota, S. Yamamoto, N. Ezaki and T. Sakurai; "On–line Japanese Character Recognition System for Visually Disabled Persons"; Abstract, Proceedings of the $13^{th}$ International Conference on pattern Recognition, p. 4; 1996.

Y. Shimada, M. Ohkura, M. Shiono and R. Hashimoto; "On Discrimination of Handwritten Similar Kanji Characters by Multiple Feature Subspace Method"; Abstract; Transactions of the Institute of Electronics, Information and Communications Engineers D–II, vol. J78D–II, No. 10, pp. 1460–1468; 1995 IEE; Oct. 1995.

K. Toyokawa, K. Kitamura, S. Katoh, H. Kaneko, N. Itoh and M. Fujita; "An On–line Character Recognition System for Effective Japanese Input"; Abstract; Proceedings of the Second International Conference on Document Analysis and Recognition (Cat. No. 93TH0578–5), pp. xx+963, 208–13; 1995.

Y. Bellik; "Media Integration in Multimodal Interfaces"; Abstract; 1997 IEEE First Workshop on Multimedia Signal Processing (Cat. No. 97TH8256), pp. xvi+596, 31–6; 1997.

M.T. Maybury; "Research on Multimedia and Multimodal Parsing and Generation"; Abstract; Artificial Intelligence Review, vol. 9, No. 2–3, pp. 103–127; Jun. 1995.

Y. Bellik; "The Time Component in Multimodal Interfaces"; Abstract; Genie Logiciel, No. 44, pp. 38–41; Jun. 1997.

A. Smith, J. Dunaway, P. Demasco and D. Peischi; "Multimodal Input for Computer Access and Augmentative Communication"; Abstract, ASSETS '96; The Second Annual ACM Conference on Assistive Technologies; p. 145, 80–5; 1996.

R. Sharma, T.S. Huang and V.I. Pavlovi'c; "A Multimodal Framework for Interacting with Virtual Environments"; Abstract; Human Interaction with Complex Systems: Conceptual Principles and Design Practice; p. 429, 53–71; 1996.

S. Oviatt and R. VanGent; "Error Resolution During Multimodal Human—computer Interaction"; Abstract; Proceedings ICSLP 96; Fourth International Conference on Spoken Language Processing (Cat. No. 96TH8206); p. 4 vol. 2522, 204–7 vol. 1; 1996.

W.M. Martinez; "A Natural Language Processor with Neural Networks"; Abstract; 1995 IEEE International Systems, Man and Cybernetics, Intelligent Systems for the $21^{st}$ Centurey (Cat. No. 95CH3576–7), p. 5 vol. 4711, 3156–61 vol. 4; 1995.

Reality Fusion; Corporate Fact Sheet; 1997–1998.

Allan Christian Long, Jr., Shankar Narayanaswamy, Andrew Burstein, Richard Han, Ken Lutz, Brian Richards, Samuel Sheng, Robert W. Brodersen and Jan Rabaey; "A Prototype User Interface for a Mobile Multimedia Terminal"; Abstract; Department of Electrical Engineering and Computer Sciences; Chi '95 Proceedings.

"Computers and Software"; Popular Science; p. 31; Mar. 1998.

Shankar Narayanaswamy and Robert Brodersen; "Pen–and–Speech Based Circuit Schematic Editor".

http://www.cogsci.kun.nl/~miami/taxonomy/node1.html; Contents; printed Apr. 13, 1998.

Adam Cheyer and Luc Julia; "Multimodal Maps: An Agent–Based Approach"; Abstract; SRI International 1995.

Phillip Cohen et al.; "Synergistic Use of Direct Manipulation and Natural Language"; Abstract; SRI International 1989.

Sharon Oviatt and Erik Olsen; "Integration Themes in Multimodal Human—Computer Interaction"; Abstract; SRI International 1994.

Sharon Oviatt, Phillip Cohen, and Michelle Want; "Reducing Linguistic Variability in Speech and handwriting through Selection of Presentation Format"; Abstract; SRI International 1993.

Sharon Oviatt, Phillip Cohen, and Michelle Want; "Toward Interface Design for Human Language Technology: Modality and Structure as Determinants of Linguistic Complexity"; Abstract; SRI International 1994.

Catherine Wolf and Palmer Morrel–Samuels; "The Use of Hand–Drawn Gestures for Text Editing"; Abstract; Thomas J. Watson Research Center and Columbia University 1987.

Lynn Wilcox, Bill Schilit, and Nitin Sawhney; "Dynomite: A Dynamically Organized Ink and Audio Notebook"; Abstract; FX Palo Alto Laboratory and MIT 1997.

Jennifer Lai and John Vergo; "MedSpeak; Report Creatin with Continuous Speech Recognition"; Abstract, IBM and Thomas J. Watson Research Center 1997.

Scott Robertson, Cathleen Wharton, Catherine Ashworth; Marita Franzke; "Dual Device user Interface Design; PDAs and Interactive Television"; Abstract; Applied Research, Collaborative Systems Group, US West Advanced Technologies 1996.

Andrew Ortony, Jon Slack and Oliviero Stock; "Cognitive Science, Artificial Intelligence and Communication"; Abstract; Institute for the Learning Sciences, Northwestern University Instituto per la Ricerca Scientifica e Technologica 1995.

Wolfgang Wahlster, Elizabeth Andre, Som Bandyopadhyay, Winfried Graf, and Thomas Rist; "WIP: The Coordinated Generation of Multimodal Presentations from a Common Representation"; Abstract; German Research Center for Artificial Intelligence 1995.

Clive Frankish, Richard Hull, and Pam Morgan; "Recognition Accuracy and User Acceptance of Pen Interfaces"; Abstract; University of Bristol (U.K.), Hewlett Packard 1995.

Laurence Nigay, Joelle Coutaz; "A Generic Platform for Addressing the Multimodal Challenge"; Abstract; Laboratoire de Genie Informatique (LGI–IMAG) 1995.

T.V. Raman; "Emacspeak—A Speech Interface"; Abstract; Cambridge Research Lab, Digital Equipment Corp. 1996.

Bibliography of Papers; Spoken Language Interaction and Design; http://www.cse.ogi.edu/CHCC/Publications/...ltimodal Interaction and Interface Design; printed Nov. 18, 1997.

"Micro Power Hidden Markov Model State Decoders for Word–Spotting and Other Applications"; The University of California at Berkeley; Technology/Business Opportunity.

"Data–Voice Mobile Communication Sensor for Cooperative Automatic Vehicle Control"; The University of California at Berkely; Technology Business Opportunity.

"CAREER: Improving the Design of Interactive Software"; University of California; Office of Technology Transfer; Federally Funded Research Project.

Synthesis, Analysis, and Perception of Visible Speech; University of California; Office of Technology Transfer; Federally Funded Research Project.

Many People Consider the Futuristic; Hotlist Jan. 1998, pp. 7–11.

"Lets' Talk! Speech Technology is the Next Big Thing in Computing. Will it Put a PC in Every Home?"; Business Week; Feb. 23, 1998; pp. 61–80.

* cited by examiner

PROCESSING HANDWRITTEN AND HAND-DRAWN INPUT AND SPEECH INPUT

This application claims priority to U.S. Provisional Patent Application No. 60/086,346, filed May 20, 1998.

BACKGROUND OF THE INVENTION

The present invention relates generally to signal processing systems and methods, and more particularly to systems that process speech and handwritten or hand-drawn gesture input.

The Provisional United States Patent Application entitled "APPARATUS AND METHOD FOR PROCESSING HAND-MARKED INPUT AND SPEECH INPUT", Serial No. 60/086,346, filed May 20, 1998, is herein incorporated by reference in its entirety.

Since the early 1980s, personal computers have become increasingly powerful, able to store large amounts of information, create complex text, and multimedia documents including now color animation, 3D effects, and sound. In addition, these devices are able to communicate over telephone lines or local area networks with other computers directly or through the Internet. These computers are able to draw on large databases stored on large capacity hard drives in the personal computers. PCs can also tap into remote databases through their networking and communications capabilities.

Although the human interface to these computers has evolved to a certain extent from the early 1980s, in many ways the major element of this interface, the keyboard, is still very similar to that of a manual typewriter whose origins date to the late part of the 19th Century. For most computers, even in the mid-990s, the 100-key keyboard with alpha/numeric and function keys still forms the basic input means for accessing and creating information on personal and other computers. Ironically, the keyboard that is in common use has its basic layout designed to slow typists down. This design dates from the days of mechanical typewriters whose keys jammed when typists became too proficient. Although many people using computers have learned to type very rapidly, for many who do not learn to type well or who do not know how to type, the keyboard interface to the computer represents a barrier to its use. In addition, many people who do learn to type well can develop a repetitive stress disorder, an inflammation of the wrists which can result in the complete inability to type and therefore loss of productivity on the computer.

In the late 1980s a pointing device, called a mouse, was developed for computer input which allows the user to move a curser or indicator within the computer output display screen. By pointing and clicking a mouse, certain words or areas on the screen may be chosen by the user. In this way, navigation of the display screen and command of computer operations may be controlled by pointing to various items or words or icons on the screen. The pointing device may be a mouse, which indirectly points to items on the screen, or a pen-type device applied directly to the screen or even a finger with a special touch screen.

Other operations are possible using these devices such as highlighting a word in order to provide an additional command by means of other switches on the pointing device to delete the word or change its appearance. The development of the graphic user interfaces (GUI), have greatly enhanced the use of pointing devices for the human interface to the computer. Although these pointing devices may substitute for a series of keystrokes for moving a pointer around on the screen or carrying out various operations, mouse operations are basically complementary to those provided by the keyboard. However, it is also difficult to operate a mouse and keyboard at the same time. In addition, it is not practical to use mouse input to create text or to input arbitrary commands to the computer.

Since the early 1990s, the use of automatic speech recognition for voice input to the computer has become an increasing reality. Voice input devices in a computer require significant computing power for their operation. Early speech recognition devices could be trained by an individual to respond to a small number of command words effectively substituting for command keys on the keyboard or a limited number of mouse clicks in a Windows interface. As computers have become more powerful in their computing speed and memory capacity, automatic speech recognition systems for computer input have become more capable. It is possible on personal computers to use voice input commands to activate any Windows command that appears in the menu structure using discrete or continuous speech recognition without requiring navigation through several layers of menus. Speech recognition systems are an especially powerful substitute for the keyboard for the input of individual words of text to create documents or for discrete commands. Such systems, however, are not a good substitute for the ease and speed of display screen navigation or other drawing operations (for example circling a block of text and moving it by dragging it to a new place on the screen), which can easily be provided by a mouse or other pointing device. Moreover, such speech recognition systems have difficulty determining whether the received speech is a command or text.

Although the promise of automatic speech recognition systems for text creation using computers is great because they are rapid and easy to use, these systems suffer from some significant limitations which have impeded their general use in computers. The accuracy of speech recognition systems, even those well trained to the voice of a single user, are limited to approximately 95%, and may be significantly lower with respect to proper names and words outside of the vocabulary, which may occur quite often in many business and technical uses of computers. Speech recognition systems are also not very effective for various editing and formatting tasks, for example, the insertion of punctuation marks. In addition, voice input is not a good mechanism for navigating the display screen of a computer and carrying out the functions of a mouse or other pointing device which allow operations such as "dragand-drop," highlighting words, moving blocks of text, manipulating and creating graphics, or indicating a text insertion point.

The physical size of computers has limited their utility in certain applications. Like many electronic devices, computers have grown dramatically smaller as they have evolved. In recent years, laptop and even palmtop computers the size of small books have become popular. A computer the size of a book, which may be carried anywhere or a small pocket-sized device, has no room for a keyboard large enough to accommodate hands of most adults. In addition, if a computer is to be used in the field as a palmtop device or even in an airplane seat, the use of a mouse-type pointing device that requires an external pad is impractical. A pointing device such as a pen for use on even a small computer display surface is extremely useful.

A number of devices without keyboards have been proposed that use pens and have handwriting recognition as input and/or receive mouse-type input. Those introduced have had limited ability to recognize even fairly clear handwriting. Although handwriting recognition by pen input devices has significantly improved in the last few years, like speech recognition, it still remains a challenging technical problem. For example, pen input in currently available systems is tiring and impractical when entering large amounts of text. Developing even smaller personal computing devices with the complete text input and computing capability of larger sized personal computers remains a major goal and interest of the computing public and the computing industry.

There is, therefore, a need for a computer system that departs from conventional methods and achieves increased performance by integrating speech recognition and handwritten and hand-drawn (e.g., pen or gesture input) recognition to overcome the disadvantages of either mode of recognition used alone or in an unintegrated combination.

SUMMARY OF THE INVENTION

Methods and apparatus consistent with this invention process handwritten or hand-drawn input and speech input. Method steps include recognizing received handwritten or hand-drawn input, recognizing received speech input, and creating or modifying an electronic document according to the speech or handwritten or hand-drawn input.

An apparatus includes structure for recognizing handwritten or hand-drawn input, structure for recognizing speech input, and structure for activating modes for processing the handwritten or hand-drawn input and the speech input responsive to handwritten or hand-drawn input or the speech input.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principles of the invention.

DETAILED DESCRIPTION OF THE INVENTION

Reference will now be made in detail to preferred embodiments illustrated in the accompanying drawings. The same numbers in different figures refer to like or similar elements.

Figure 1:
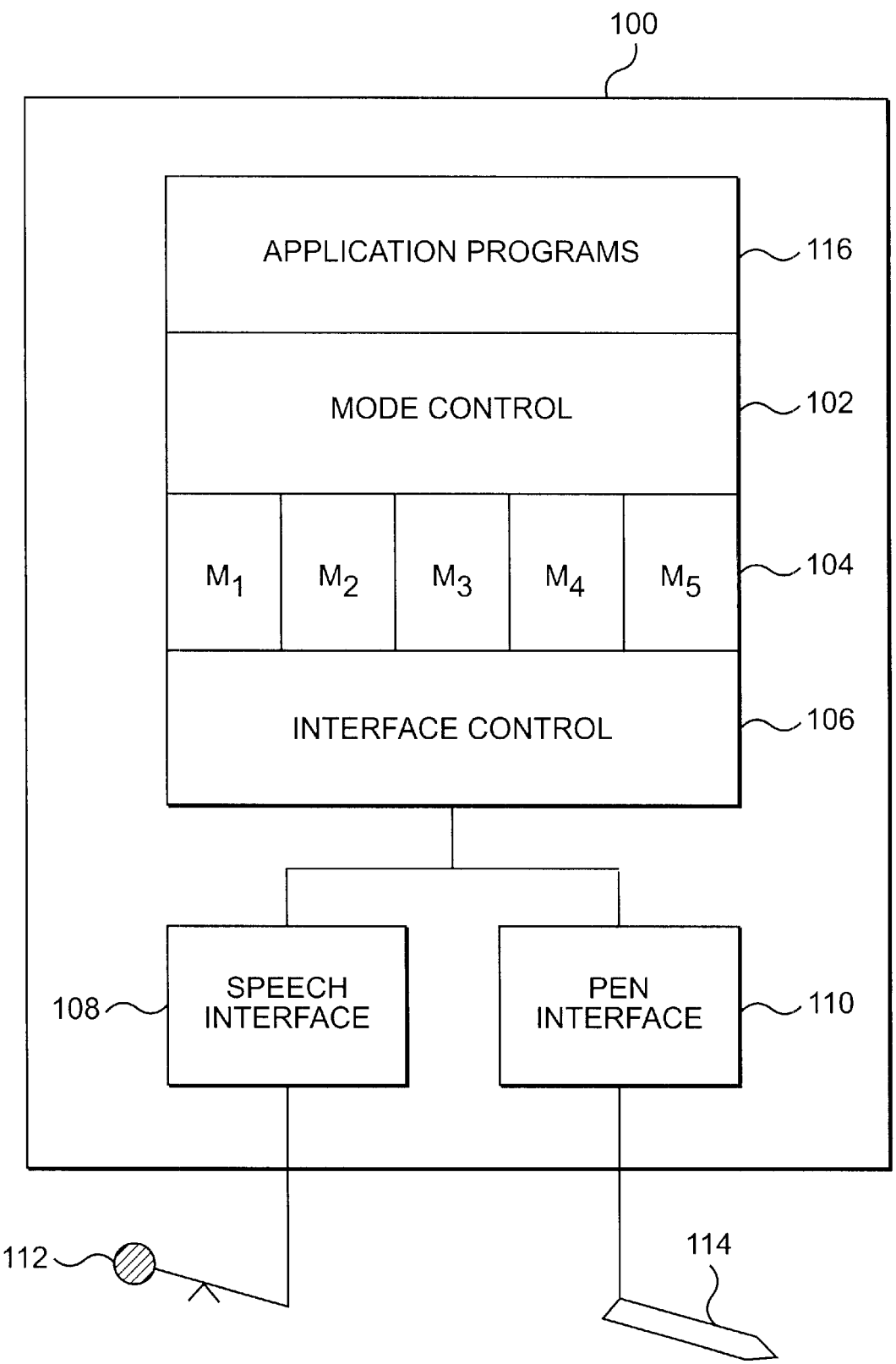
FIG. 1 is a block diagram of a computer system for processing handwritten or hand-drawn input and speech input.

FIG. 1 is a block diagram of computer system 100 for processing handwritten or hand-drawn input and speech input comprising mode controller 102, mode processing logic 104, interface controller 106, speech interface 108, pen interface 110, and application programs 116. Microphone 112 connects to speech interface 108. Electronic pen 114 connects to pen interface 110.

Interface controller 106 controls speech interface 108 and pen interface 110, providing pen or speech input to mode controller 102. Speech interface 108 preferably includes computer hardware and software for encoding an electronic signal generated by microphone 112 into a digital stream for processing by mode processing logic 104. Similarly, pen interface 110 preferably includes computer hardware and software for processing handwritten or hand-drawn input created with electronic pen 114.

Mode controller 102 activates modes in mode processing logic 104 according to input received from interface controller 106 to create an operating state for computer system 100. An operating state governs how input received from interface controller 106 is processed and passed to application programs 116. Application programs 116 include, for example computer programs for creating, editing, and viewing electronic documents, such as word processing, graphic design, spreadsheet, electronic mail, and web browsing programs.

An operating state is defined by one or more active modes in mode processing logic 104. Mode processing logic 104 preferably supports five modes. The processing logic in mode M1 recognizes speech input to microphone 112. In mode M1, computer system 100 translates the speech input into a machine encoded (e.g., ASCII) text stream. For example, in mode M1, computer system 100 translates continuous speech spoken by an operator into microphone 112 into machine encoded text data forming part of an electronic document.

In mode M2, the processing logic recognizes pen input, i.e., it translates handwritten or hand-drawn input received from electronic pen 114 into a machine encoded text stream. For example, In mode M2, computer system 100 translates hand-printed or cursive writing written by an operator using electronic pen 114 into machine encoded text data forming part of an electronic document.

In mode M3, the processing logic recognizes hand-drawn graphic images created with electronic pen 114. For example, in mode M3, computer system 100 recognizes an attempt by the operator to draw a rough outline for a circle, triangle, or square. The processing logic in mode may M3 create a corresponding "clean" (e.g., smooths curves, straightens lines, and corrects any geometric distortions) electronic representation of the drawing by issuing a snap-to-grid command.

In mode M4, the processing logic treats input received from electronic pen 114 as a command or an indication of a position in an electronic display. In mode M5, the processing logic recognizes speech input received from microphone 112 as a command. The commands recognized in modes M4 and M5 include, for example, commands or menus that are accessible from tool bars and pull-down menus in many graphics and text application programs.

Figure 2:
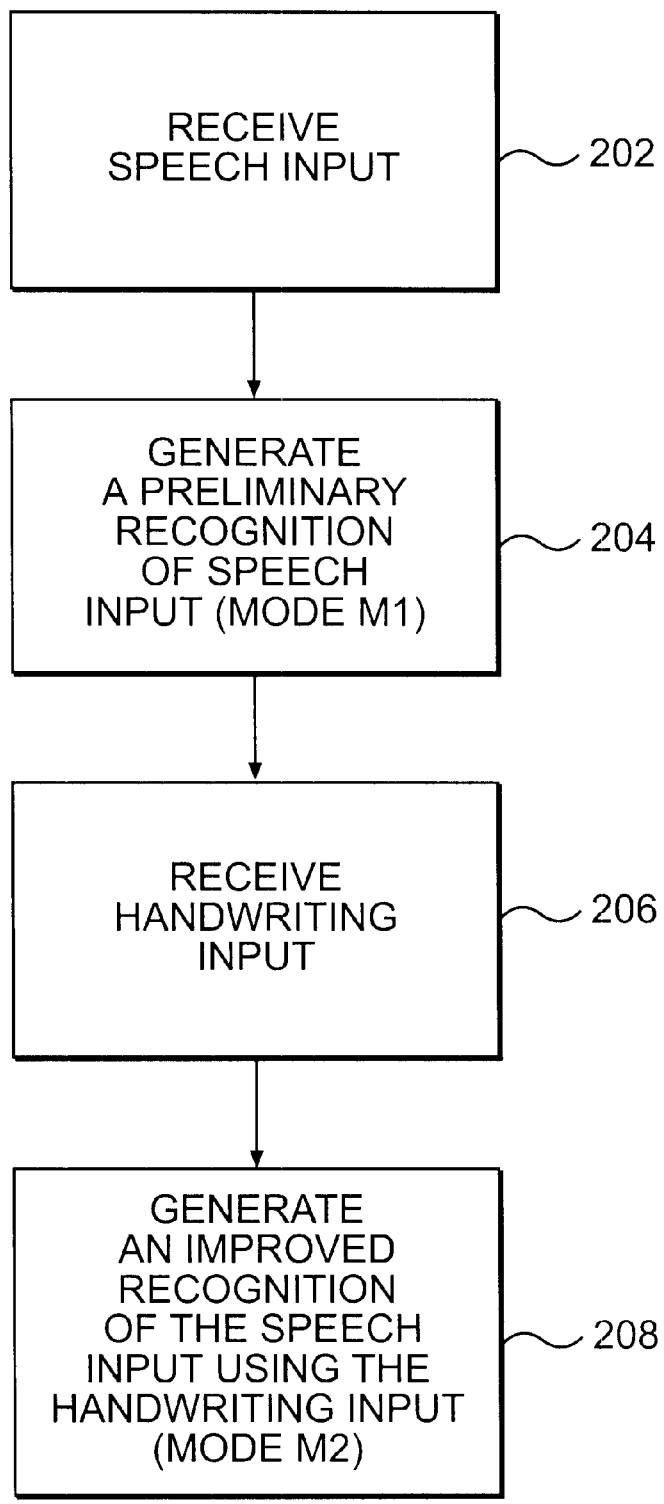
FIG. 2 is a flow diagram of a method for processing speech and handwritten input.

A "combination mode" consists of two or more active modes. One such combination mode is an operating state where modes M1 and M2 are active. FIG. 2 is a flow diagram of a method for processing speech and handwritten input. According to the method shown in FIG. 2, the computer system receives speech input by an operator (step 202). Next the computer system generates a preliminary recognition of the speech input using mode M1 (step 204). For example, the computer's preliminary classification would identify several text strings, letters, characters, or words corresponding to the closest matches to the recognized speech input. The operator then enters handwriting input providing the computer system with additional data to improve recognition of the input speech (step 206). Using mode M2, computer system 100 generates an improved recognition of the input speech from additional data in mode M2 to select from among recognition candidates identified by mode M1 at step 204.

Figure 3:
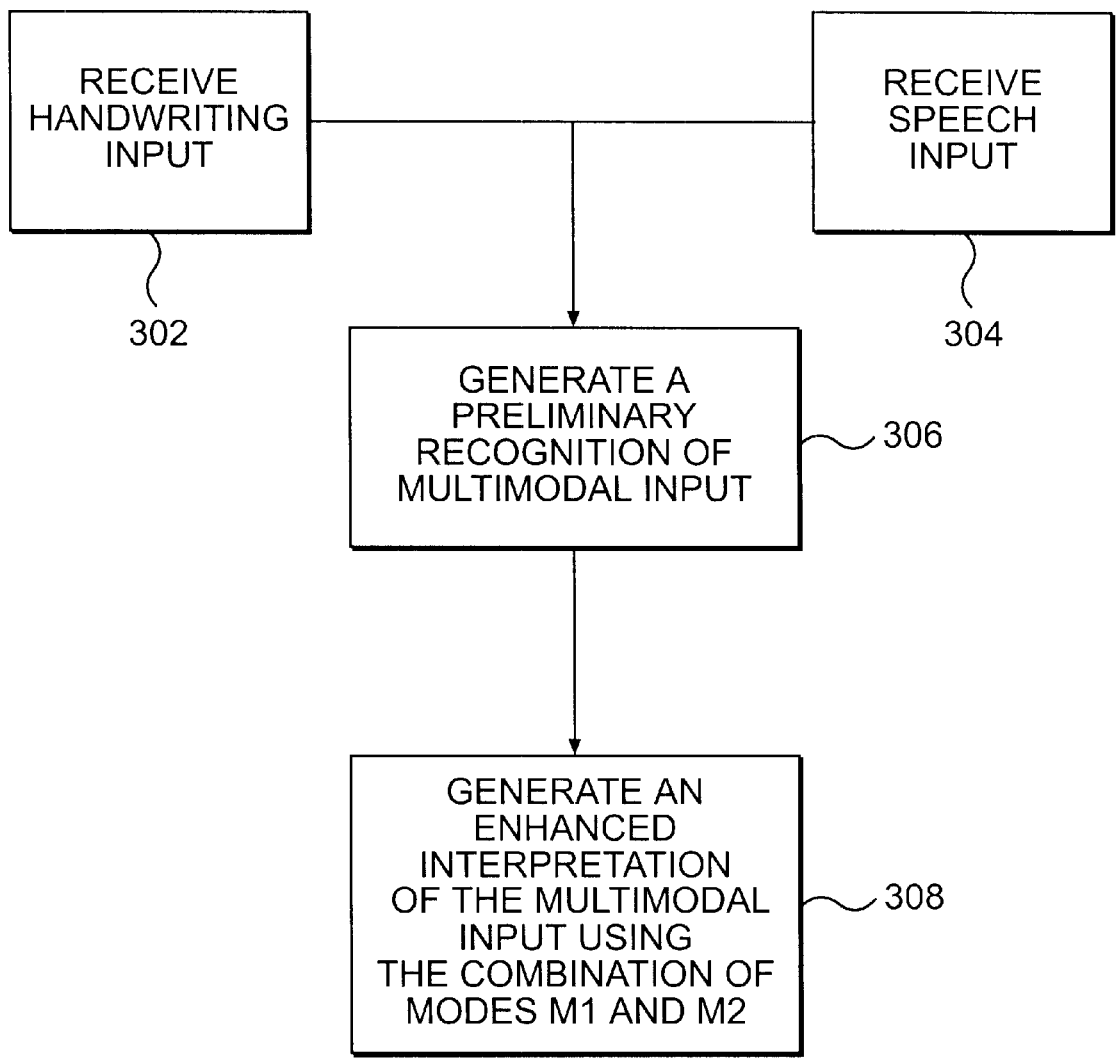
FIG. 3 is a flow diagram of a second method for processing speech and handwritten input.

FIG. 3 is a flow diagram of a method for processing speech and handwritten input where speech input is used to enhance the interpretation of handwriting or hand-drawn input and speech input (multimodal input). According to the method shown in FIG. 3, computer system 100 receives handwriting input (step 302) and speech input from an operator (step 304). Next system 100 generates a preliminary recognition of the multimodal input (step 306). Using mode M1 and M2, the computer system generates an enhanced interpretation of the input using the additional data provided by both the handwritten or hand-drawn input and input speech (step 308).

Figure 4:
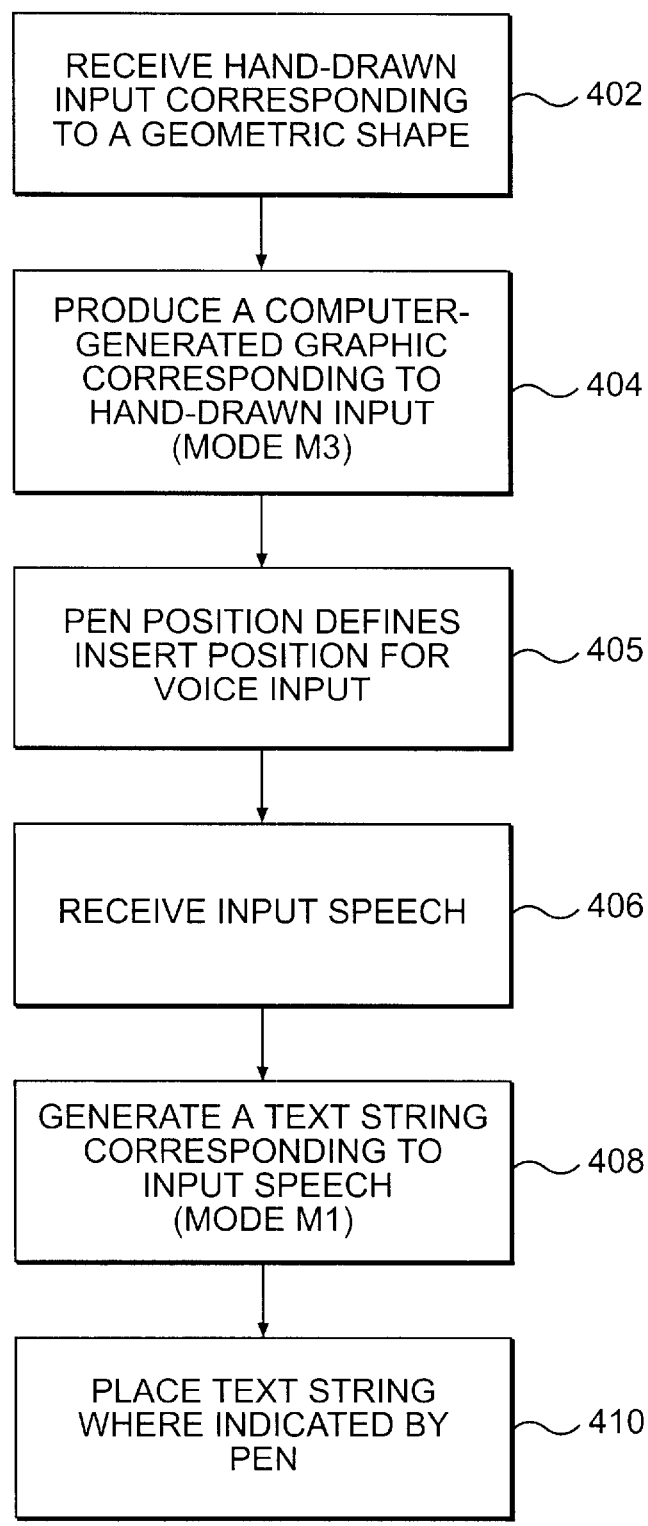
FIG. 4 is a flow diagram of a method for processing hand-drawn input and speech input.

In a second combination mode, the operating state has both modes M1 and M3 active. FIG. 4 is a flow diagram of a method for processing hand-drawn input and speech input. Computer system 100 receives a geometric shape or figure drawn by the operator using electronic pen 114 (step 402). System 100 generates a graphic corresponding to the hand-drawn geometric shape using processing mode M3 (step 404). The location of the electronic pen defines an insert position in an electronic document for text recognized from the speech input (step 405). The computer system then receives speech input corresponding to text to be placed in the electronic document (step 406). Using processing mode M1, computer system 100 generates a text string from the speech input (step 408). System 100 places the text where indicated by the pen (step 410). The foregoing method is useful when creating annotated charts, for example, corporate organization charts. Using this method, an operator uses an electronic pen to sketch rough outlines of boxes corresponding to the organization structure, the computer cleans-up the boxes, and the user dictates annotations that are automatically inserted where indicated by the pen in the figure.

Figure 5:
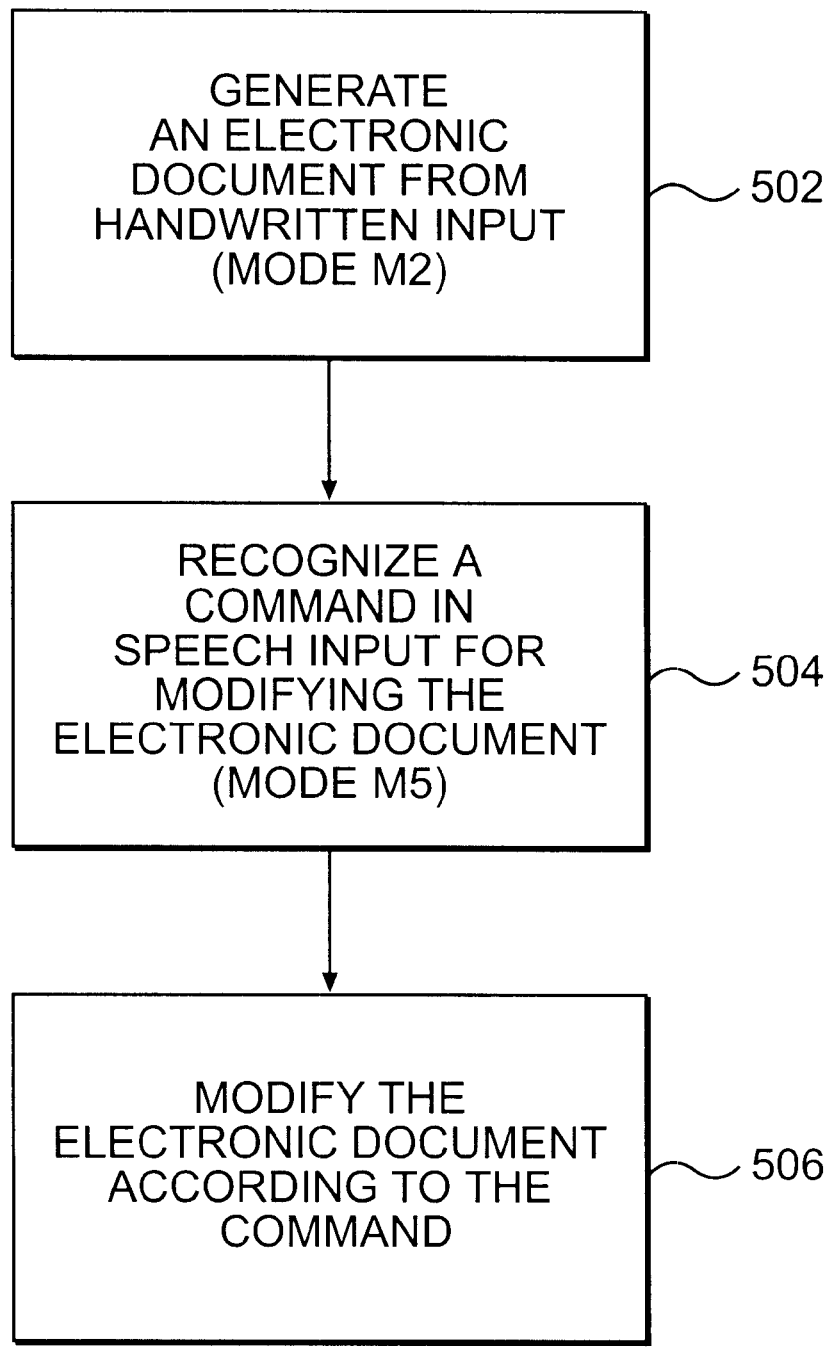
FIG. 5 is a flow diagram of a method for processing handwritten input and speech input.

In a third combination mode, the operating state has both modes M2 and M5 active. FIG. 5 is a flow diagram of a method for processing handwritten input and speech input. Using a computer input device, for example, electronic pen 114, an operator writes text that computer system 100, using processing logic in mode M2, recognizes and generates an electronic document (step 502). To format or modify the document, the operator speaks commands into microphone 112 that are recognized by computer system 100 using processing logic in mode M5 (step 504). Computer system 100 modifies the electronic document as instructed by the command (step 506).

Using computer system 100 in an operating state with modes M2 and M5 active, an operator can create a memo by printing or cursive writing and have the words recognized and displayed on a computer screen. To format the memo as it is being created, the operator can utter commands into the microphone such as "bold," "underline," "paragraph," etc. The electronic document that is displayed on the screen will change in response to these commands.

Figure 6:
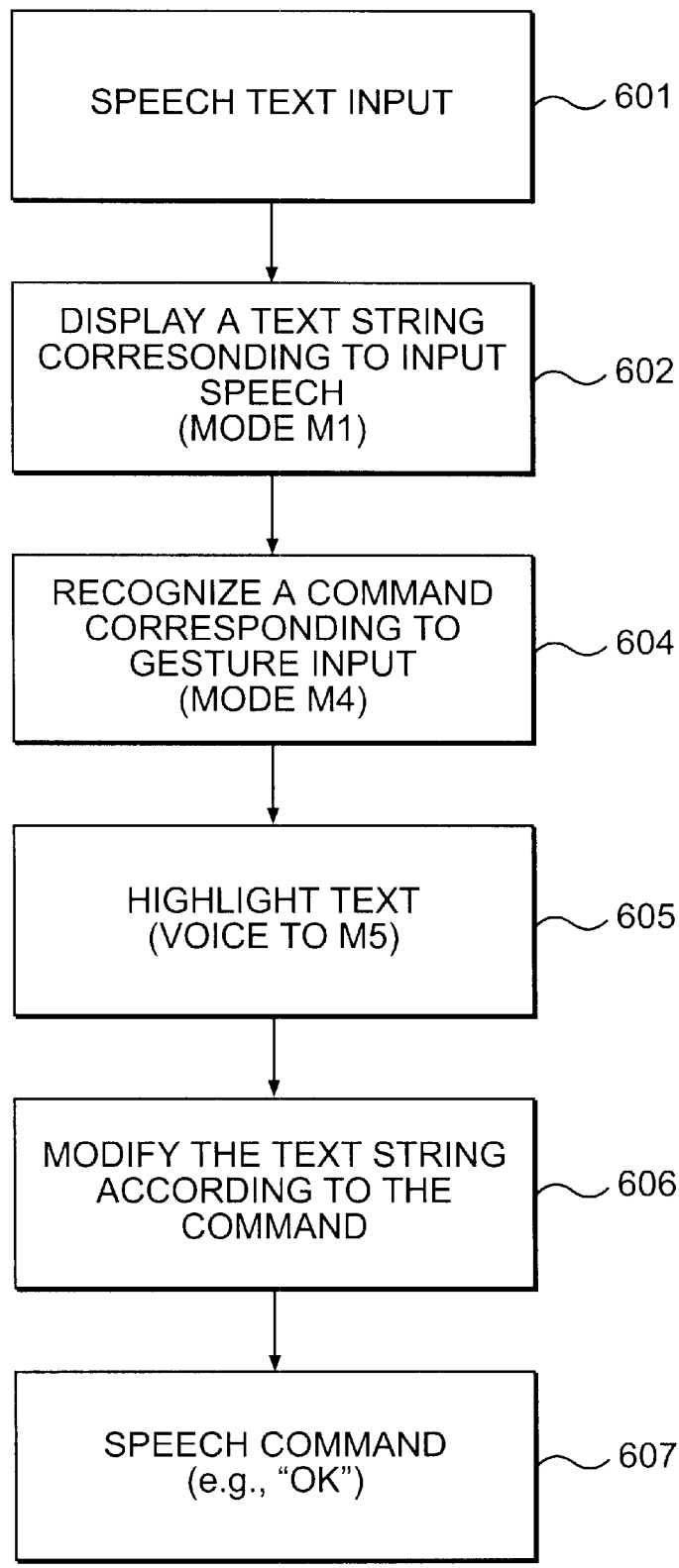
FIG. 6 is a flow diagram of a method for processing handwritten input and speech input.

In a fourth combination mode, the operating state has both modes M1 and M4 active. FIG. 6 is a flow diagram of a method for processing handwritten input and speech input. In this operating state, mode M1 processing logic recognizes speech spoken into microphone 114 (step 601) and displays a corresponding text string on a computer display (not shown) connected to computer system 100 (step 602). The operator using electronic pen 114 makes gestures, for example, directly on the display or on an electronic tablet that are recognized by M4 processing logic as commands for modifying the text (step 604). (Any voice commands would be handled by M5 processing logic when the M5 mode is activated.) Computer system 100 then applies the command to the text in accordance with an established mapping of gestures to commands (step 606). Examples of these gesture-to-command mappings include circling a word to indicate highlighting, which activates combination mode M4–M5, thereby switching the system from state M1–M5 to state M4–M5. A spoken command such as "bold" accomplishes the editing. A spoken command, such as "OK" completes the process (step 607). Another example of gesture-to-command mapping is scratching through a word on the screen with the pen to delete it, activating state M1–M2 that allows a new word to be written in place of the scratched out word.

Figure 7:
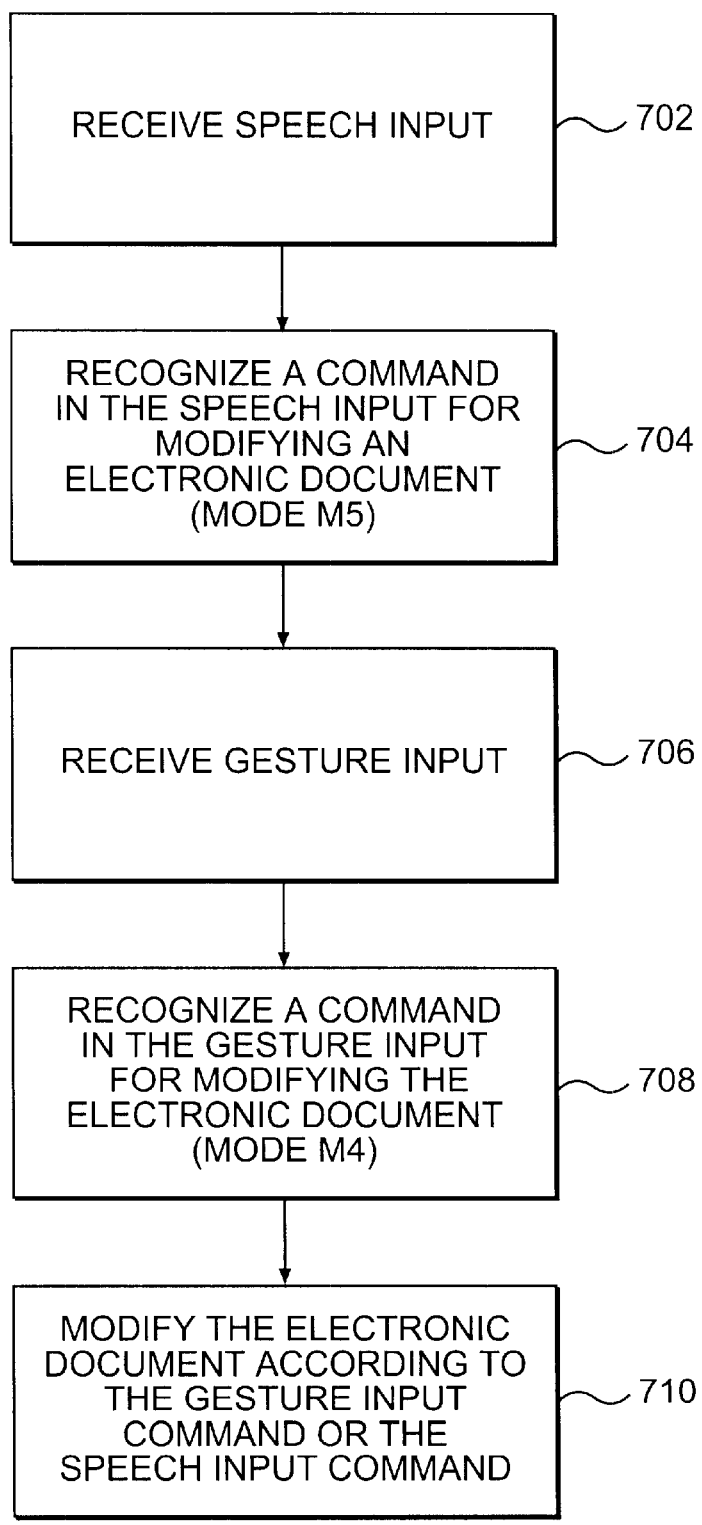
FIG. 7 is a flow diagram of a method for editing an electronic document.

In a fifth combination mode, the operating state has both modes M4 and M5 active. FIG. 7 is a flow diagram of a method for editing an electronic document in this operating state. Computer system 100 receives speech input from an operator specifying an editing command (step 702). Using M5 processing logic, computer system 100 recognizes a command in the speech input (step 704). Computer system 100 also receives gesture input from the operator indicating a command that can also include the spatial coordinates of the portion of the electronic document to be edited (step 706). Computer system 100 M4 processing logic recognizes a command in the gesture input (step 708). Computer system 100 then modifies the electronic document according to either or both the command from the speech input and the command from the gesture input (step 710).

Using computer system 100 in this operating state is advantageous when an operator desires to modify an electronic document, such as a drawing created in a computer graphics application program or a document created in a word processing application program. For example, to modify a drawing in a graphics editing context using electronic pen 114, the operator would circle a portion of the drawing displayed on a computer screen. The operator would then say "change color from red to blue." Application program 116 then responds to the spoken and gesture commands and changes the color of the circled region in the drawing from red to blue.

Figure 8:
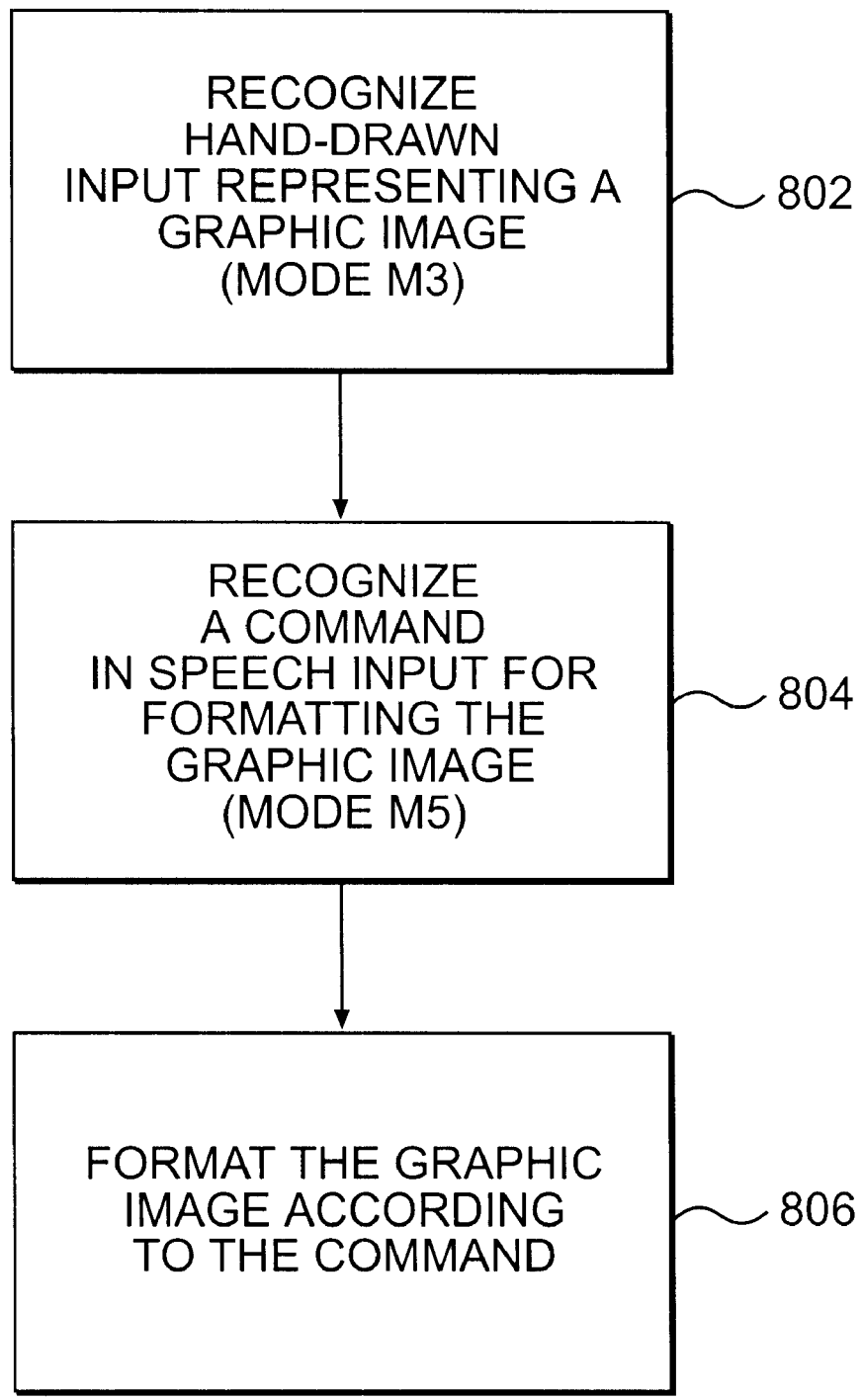
FIG. 8 is a flow diagram of a method for processing hand-drawn input and speech input.

In a sixth combination mode, the operating state has both modes M3 and M5 active. FIG. 8 is a flow diagram of a method for processing hand-drawn input and speech input. Using processing logic in mode M3, Computer system 100 recognizes hand-drawn input from electronic pen 114 corresponding to, for example, graphic images (circles, triangles, squares, line drawings, etc.) (step 802). Mode processing logic in mode M5 recognizes a command in the speech input for formatting the graphic image (step 804). Application program 116 formats the graphic image according to the command (step 806). This operating state allows an operator to create drawings quickly without navigating through complex pull-down menus. For example, an operator sketches the outline of a square with electronic pen 114 and says "fill color black, cross-hatch, dashed outline." Computer system 100 then creates a square (straightens the lines drawn by the operator, makes them of equal length, and connects them at right angles) and formats it according to the spoken commands.

The foregoing five modes are not exhaustive of all possible modes. Moreover, the six combinations of modes is only illustrative of a limited number of the many possible combinations of the modes for an operating state. Therefore, this invention is not limited to the particular modes and combinations disclosed, but includes all modes and combinations falling within the scope of the claims.

Figure 10:
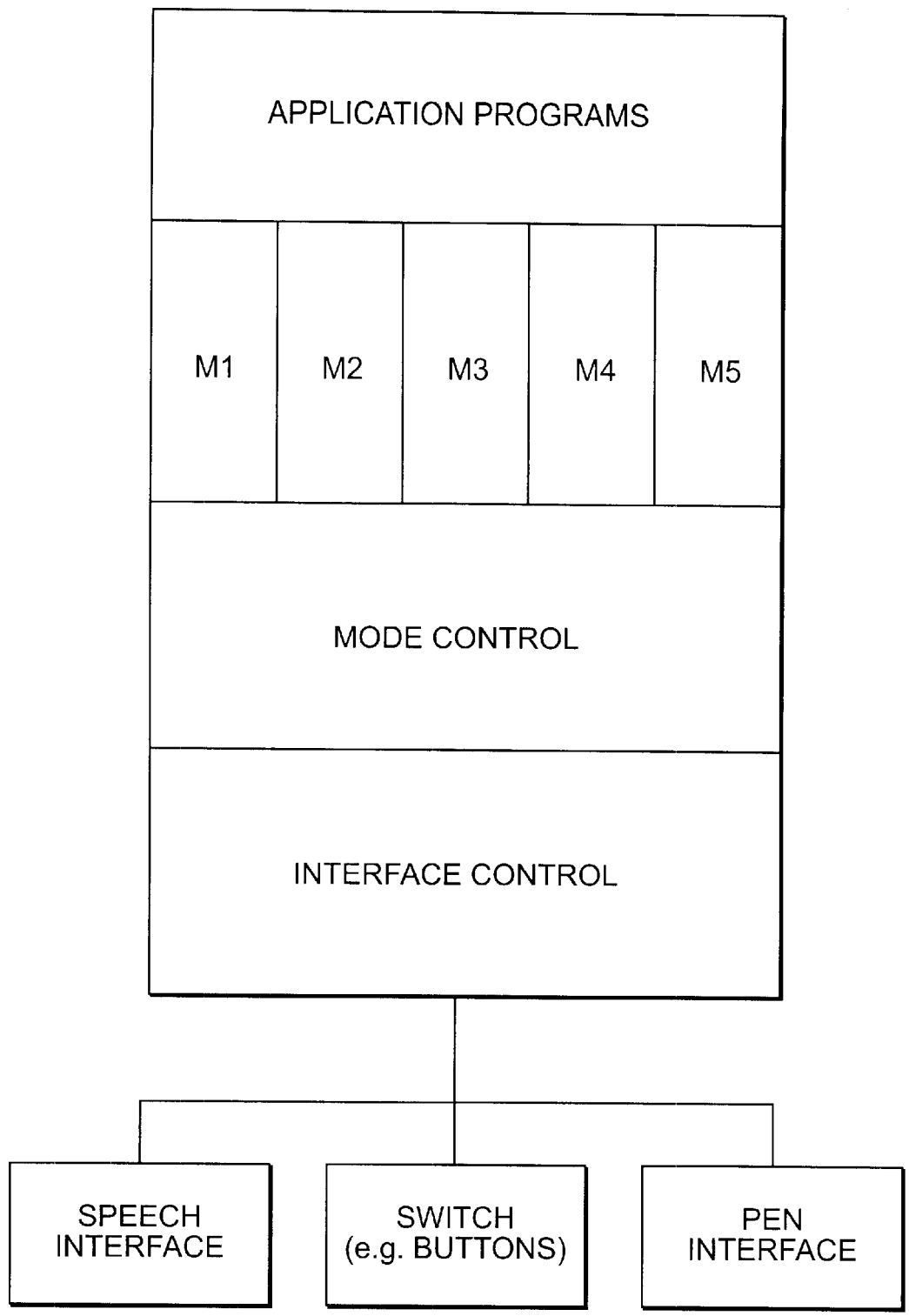
FIG. 10 is a block diagram of a computer system with a mode switch for processing gesture, handwritten, or hand-drawn input and speech input.

In an embodiment, computer system 100 mode controller 102 switches between modes and combination modes thereby switching operating states. Switching operating states changes the manner in which structure for recognizing gesture input recognizes gestures, handwritten, and hand-drawn input, and the structure for recognizing speech input recognizes speech. For example, as described in greater detail above, switching among modes and combinations of modes will control whether the recognition process will treat gesture input as a command, text, or drawing, and whether speech input is recognized as a command or text. Switching among operating states can be controlled by, for example, application program 116, gestures received by pen interface 110, speech received by speech interface 108, or an electronic or mechanical switch. A switch or button can be connected to computer system 100, microphone 112, electronic pen 114, or any other peripheral device associated with computer system 100 (e.g., a digitizing tablet connected to computer system to control switching among operating states. Other types of controls for switching operating states include rotating wheels, numeric keypads, and chorded keypads for one-handed letter input. FIG. 10 is a block diagram of a computer system with switch 1002 for processing handwritten and hand-drawn input and speech input.

Methods and apparatus for processing speech and handwritten and hand-drawn input are suitable for several application environments including, but not limited to, information kiosks, television/video cassette recorder remote control, a low profile computer with a form factor similar to a pad of paper (e.g., slate or pen tablet computer), a palm computer, a telephone, an electronic whiteboard, or a hand-held personal computer.

Figure 9:
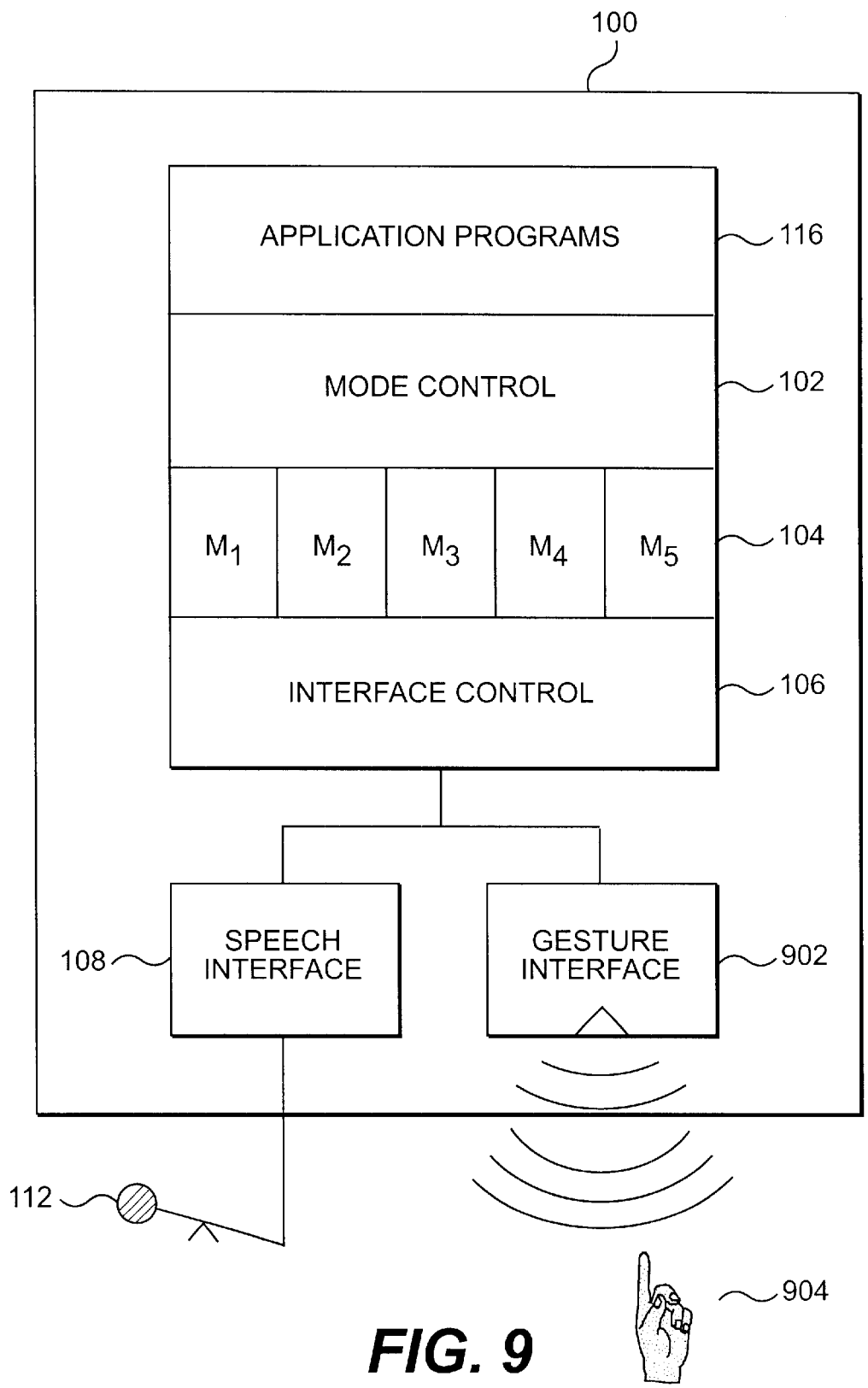
FIG. 9 is a block diagram of a computer system for processing gesture, handwritten, or hand-drawn input and speech input.

Computer system 100 can receive several types of devices for providing gesture interaction with mode processing logic 104. FIG. 9 is a block diagram of computer system 100 for processing gesture, handwritten, and hand-drawn input and speech input comprising several of the elements described in greater detail above in FIG. 1, and wireless gesture interface 902. Pointing device 904 is an electronic glove that tracks and transmits movement of the operator's hand. Alternatively, pointing device 904 could be a three-dimensional wireless mouse or wand. In yet another implementation, structure for providing gesture interface 902 includes a video tracking device, for example, the interface made by Reality Fusion that tracks the movement of the operator's hand as it makes gestures in the air.

A computer display can be connected to, or integrated within, computer system 100. To provide the operator with feedback regarding the operating state, the appearance of the display changes in accordance with a change in operating state. For example, in a combination mode with M1 and M4 active, the display would have a white background. Changing the operating state to a combination mode with M2 and M5 active would display ruled or grid lines on the background of the display. Similarly, a background color change would indicate yet another operating state.

While some embodiments have been described, various changes and modifications may be made, and equivalents may be substituted. In addition, many modifications may be made to adapt a particular element, technique or implementation to the teachings of the present invention without departing from the central scope of the invention. For example, disclosed elements may be implemented in hardware, computer program code, or a combination of both hardware and computer program code. Moreover, elements depicted and described separately may be combined and implemented in a single element or distributed across a computer network. Therefore, this invention is not limited to the particular embodiments and methods disclosed, but includes all embodiments falling within the scope of the appended claims.

We claim:

1. A method for processing handwritten input or hand-drawn input and speech input comprising the steps, performed by a computer, of:
    selecting a first operating mode and a second operating mode before processing handwritten input, hand-drawn input, or speech input;
    recognizing the speech input as either a command or text for an electronic document in accordance with said first operating mode;
    recognizing the handwritten or hand-drawn input as a command, text for an electronic document, or a graphic for an electronic document in accordance with said second operating mode; and
    switching said first operating mode or said second operating mode to change how the computer recognizes said speech input or said handwritten or hand-drawn input.

2. The method of claim 1, wherein the step of switching said first operating mode or said second operating mode includes the substep of switching either said first mode or said second mode in response to a gesture.

3. The method of claim 1, wherein the step of switching said first operating mode or said second operating mode includes the substep of switching either said first mode or said second mode in response to speech input.

4. The method of claim 1, wherein the step of switching said first operating mode or said second operating mode includes the substep of switching either said first mode or said second mode in response to a mechanical switch activated by an operator.

5. A method for processing handwritten input or hand-drawn input and speech input comprising the steps, performed by a computer, of:
    selecting a first combination mode and a second combination mode before processing handwritten hand-drawn, or speech input;
    processing said handwritten input or said speech input in said first combination mode wherein said speech input is recognized as text input and said handwritten input is recognized as a command;
    processing said handwritten input or said speech input in said second combination mode wherein said speech input is recognized as text and said handwritten input is recognized as text; and
    switching processing modes between said first combination mode and said second combination mode.

6. A method for processing handwritten input or hand-drawn input and speech input comprising the steps, performed by a computer, of:
    selecting a first combination mode and a second combination mode before processing handwritten, hand-drawn, or speech input;

processing said handwritten input or said speech input in said first combination mode wherein said speech input is recognized as text input and said handwritten input is recognized as a command;

processing said handwritten input or said speech input in said second combination mode wherein said speech input is recognized as a command and said handwritten input is recognized as a command; and switching processing modes between said first combination mode and said second combination mode.

7. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a command;

processing said handwritten input or said speech input in said second combination mode wherein said speech input is recognized as a command and said handwritten input is recognized as text; and switching processing modes between said first combination mode and said second combination mode.

8. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text and said handwritten input is recognized as text;

processing said handwritten input or said speech input in said second combination mode wherein said speech input is recognized as a command and said handwritten input is recognized as a command; and switching processing modes between said first combination mode and said second combination mode.

9. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text and said handwritten input is recognized as text;

processing said handwritten input or said speech input in said second combination mode wherein said speech input is recognized as a command and said handwritten input is recognized as text; and switching processing modes between said first combination mode and said second combination mode.

10. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as a command and said handwritten input is recognized as text;

processing said handwritten input or said speech input in said second combination mode wherein said speech input is recognized as a command and said handwritten input is recognized as a command; and switching processing modes between said first combination mode and said second combination mode.

11. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a command;

processing said handwritten input or said speech input in said second combination mode wherein said speech input is recognized as text input and said handwritten input is recognized as a graphic; and switching processing modes between said first combination mode and said second combination mode.

12. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a command;

processing said handwritten input or said speech input in said second combination mode wherein said speech input is recognized as a command and said handwritten input is recognized as a graphic; and switching processing modes between said first combination mode and said second combination mode.

13. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text and said handwritten input is recognized as text;

processing said handwritten input or said speech input in said second combination mode wherein said speech input is recognized as text input and said handwritten input is recognized as a graphic; and switching processing modes between said first combination mode and said second combination mode.

14. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text and said handwritten input is recognized as text;

processing said handwritten input or said speech input in said second combination mode wherein said speech input is recognized as a command and said handwritten input is recognized as a graphic; and switching processing modes between said first combination mode and said second combination mode.

15. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a graphic;

processing said handwritten input or said speech input in said second combination mode wherein said speech input is recognized as a command and said handwritten input is recognized as a command; and switching processing modes between said first combination mode and said second combination mode.

16. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a graphic;

processing said handwritten input or said speech input in said second combination mode wherein said speech input is recognized as a command and said handwritten input is recognized as text; and switching processing modes between said first combination mode and said second combination mode.

17. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as text input and said handwritten input is recognized as a graphic;

processing said handwritten input or said speech input in said second combination mode wherein said speech input is recognized as a command and said handwritten input is recognized as a graphic; and switching processing modes between said first combination mode and said second combination mode.

18. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as a command and said handwritten input is recognized as a command;

processing said handwritten input or said speech input in said second combination mode wherein said speech input is recognized as a command and said handwritten input is recognized as a graphic; and switching processing modes between said first combination mode and said second combination mode.

19. A method for processing handwritten input or hand-drawn input and speech input comprising the steps, performed by a computer, of:

selecting a first combination mode and a second combination mode before processing handwritten, hand-drawn, or speech input;

processing said handwritten input or said speech input in said first combination mode wherein said speech input is recognized as a command and said handwritten input is recognized as text input;

processing said handwritten input or said speech input in said second combination mode wherein said speech input is recognized as a command and said handwritten input is recognized as a graphic; and switching processing modes between said first combination mode and said second combination mode.

20. A pen tablet computer for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

21. The pen tablet computer of claim 20 further comprising a pen-integrated microphone.

22. A palm computer for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

23. The palm computer of claim 22 further comprising a pen-integrated microphone.

24. A kiosk computer system for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

25. The kiosk computer system of claim 24, wherein said means for recognizing the handwritten or hand-drawn input includes either a touch screen, a digitizing tablet, or a video gesture recognizer.

26. A computer for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

27. The computer of claim 26, wherein said means for recognizing the handwritten or hand-drawn input includes either a touch screen, a digitizing tablet, a three-dimensional wireless mouse, or a video gesture recognizer.

28. The computer of claim 26 further comprising a display with a background responsive to an operating state of either said means for recognizing the speech input or said means for recognizing the handwritten or hand-drawn input.

29. The display of claim 28 further comprising
means for changing screen tint.

30. The display of claim 28 further comprising
means for displaying lines.

31. A television or video cassette recorder remote control for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

32. The television or video cassette recorder remote control of claim 31, wherein said means for recognizing the handwritten or hand-drawn input includes either a three-dimensional wireless mouse or a video gesture recognizer.

33. An electronic whiteboard for processing handwritten input or hand-drawn input and speech input comprising:

selecting a first operating mode and a second operating mode before processing handwritten, hand-drawn, or speech input;

means for recognizing the speech input as either a command or text for an electronic document in accordance with said first operating mode;

means for recognizing the handwritten or hand-drawn input as a command, text for an electronic document, or a graphic for an electronic document in accordance with said second operating mode; and means for switching said first operating mode or said second operating mode to change how the computer recognizes said speech input or said handwritten or hand-drawn input.

34. The electronic whiteboard of claim 33, wherein said means for recognizing the handwritten or hand-drawn input includes either a three-dimensional wireless mouse, a pen, a touch screen, or a video gesture recognizer.

35. A computer for processing handwritten input or hand-drawn input and speech input comprising:

means for recognizing handwritten or hand-drawn input;
means for recognizing speech input; and
a mechanical switch for switching among operating modes, wherein said operating modes include
a first mode wherein said means for recognizing speech input recognizes speech as text,
a second mode wherein said means for recognizing speech input recognizes speech as a command,
a third mode wherein said means for recognizing handwritten or hand-drawn input recognizes handwritten input as text,
a fourth mode wherein said means for recognizing handwritten or hand-drawn input recognizes hand-drawn input as a graphic, and
a fifth mode wherein said means for recognizing handwritten or hand-drawn input recognizes handwritten or hand-drawn input as a command.

36. A pen tablet computer for processing handwritten input or hand-drawn input and speech input comprising:

means for recognizing handwritten or hand-drawn input;
means for recognizing speech input; and
a mechanical switch for switching among operating modes, wherein said operating modes include
a first mode wherein said means for recognizing speech input recognizes speech as text,
a second mode wherein said means for recognizing speech input recognizes speech as a command,
a third mode wherein said means for recognizing handwritten or hand-drawn input recognizes handwritten input as text,
a fourth mode wherein said means for recognizing handwritten or hand-drawn input recognizes hand-drawn input as a graphic, and
a fifth mode wherein said means for recognizing handwritten or hand-drawn input recognizes handwritten or hand-drawn input as a command.

37. A palm computer for processing handwritten input or hand-drawn input and speech input comprising:

means for recognizing handwritten or hand-drawn input;
means for recognizing speech input; and
a mechanical switch for switching among operating modes, wherein said operating modes include
a first mode wherein said means for recognizing speech input recognizes speech as text, a second mode wherein said means for recognizing speech input recognizes speech as a command, a third mode wherein said means for recognizing handwritten or hand-drawn input recognizes handwritten input as text, a fourth mode wherein said means for recognizing handwritten or handwritten input recognizes hand-drawn input as a graphic, and a fifth mode wherein said means for recognizing handwritten or handwritten input recognizes handwritten or hand-drawn input as a command.

38. A telephone for processing handwritten input or hand-drawn input and speech input comprising:

means for recognizing handwritten or hand-drawn input;

means for recognizing speech input; and a mechanical switch for switching among operating modes, wherein said operating modes include a first mode wherein said means for recognizing speech input recognizes speech as text, a second mode wherein said means for recognizing speech input recognizes speech as a command, a third mode wherein said means for recognizing handwritten or hand-drawn input recognizes handwritten input as text, a fourth mode wherein said means for recognizing handwritten or hand-drawn input recognizes hand-drawn input as a graphic, and a fifth mode wherein said means for recognizing handwritten or hand-drawn input recognizes handwritten or hand-drawn input as a command.

39. A television or video cassette recorder remote control for processing handwritten input or hand-drawn input and speech input comprising:

means for recognizing handwritten or hand-drawn input;

means for recognizing speech input; and a mechanical switch for switching among operating modes, wherein said operating modes include a first mode wherein said means for recognizing speech input recognizes speech as text, a second mode wherein said means for recognizing speech input recognizes speech as a command, a third mode wherein said means for recognizing handwritten or hand-drawn input recognizes handwritten input as text, a fourth mode wherein said means for recognizing handwritten or hand-drawn input recognizes hand-drawn input as a graphic, and a fifth mode wherein said means for recognizing handwritten or hand-drawn input recognizes handwritten or hand-drawn input as a command.

40. An electronic whiteboard for processing handwritten input or hand-drawn input and speech input comprising:

means for recognizing handwritten or hand-drawn input;

means for recognizing speech input; and a mechanical switch for switching among operating modes, wherein said operating modes include a first mode wherein said means for recognizing speech input recognizes speech as text, a second mode wherein said means for recognizing speech input recognizes speech as a command, a third mode wherein said means for recognizing handwritten or hand-drawn input recognizes handwritten input as text, a fourth mode wherein said means for recognizing handwritten or hand-drawn input recognizes hand-drawn input as a graphic, and a fifth mode wherein said means for recognizing handwritten or hand-drawn input recognizes handwritten or hand-drawn input as a command.

* * * * *

UNITED STATES PATENT AND TRADEMARK OFFICE
CERTIFICATE OF CORRECTION

PATENT NO.   : 6,438,523 B1
DATED        : August 20, 2002
INVENTOR(S)  : John A. Oberteuffer et al.

It is certified that error appears in the above-identified patent and that said Letters Patent is hereby corrected as shown below:

<u>Column 8,</u>
Line 50, after "handwritten" insert a comma.

<u>Column 15,</u>
Line 7, "handwritten input" should read -- hand drawn input --.
Line 10, "handwritten input" should read -- hand-drawn input --.

Signed and Sealed this

Fourth Day of February, 2003

JAMES E. ROGAN
*Director of the United States Patent and Trademark Office*